United States Patent
Olbert et al.

(10) Patent No.: US 7,854,906 B2
(45) Date of Patent: *Dec. 21, 2010

(54) REACTOR FOR CARRYING OUT A REACTION BETWEEN TWO FLUID STARTING MATERIALS OVER A CATALYST BED WITH PREMIXING OF THE FLUID STARTING MATERIALS IN A MIXING-IN DEVICE

(75) Inventors: Gerhard Olbert, Dossenheim (DE); Franz Corr, Ludwigshafen (DE); Sven Crone, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 432 days.

This patent is subject to a terminal disclaimer.

(21) Appl. No.: 11/959,008

(22) Filed: Dec. 18, 2007

(65) Prior Publication Data
US 2008/0145285 A1 Jun. 19, 2008

Related U.S. Application Data

(60) Provisional application No. 60/870,945, filed on Dec. 20, 2006.

(30) Foreign Application Priority Data

Dec. 19, 2006 (DE) ........................ 10 2006 060 507

(51) Int. Cl.
| | |
|---|---|
| *F28D 7/00* | (2006.01) |
| *B01J 8/00* | (2006.01) |
| *B01J 8/04* | (2006.01) |
| *B01J 8/08* | (2006.01) |
| *B01J 35/02* | (2006.01) |
| *F28F 1/00* | (2006.01) |
| *C10G 55/02* | (2006.01) |
| *C10G 51/02* | (2006.01) |
| *C10G 35/10* | (2006.01) |

(52) U.S. Cl. .................. 422/200; 422/187; 422/188; 422/189; 422/201; 422/210; 208/49; 208/176; 137/896; 165/177

(58) Field of Classification Search ................. 422/200, 422/201, 220, 188, 218, 187, 189; 137/896; 165/177; 208/49, 176
See application file for complete search history.

(56) References Cited

U.S. PATENT DOCUMENTS 2,276,307 A * 3/1942 Houdry ....................... 422/200

(Continued)

*Primary Examiner*—Walter D Griffin
*Assistant Examiner*—Natasha Young
(74) *Attorney, Agent, or Firm*—Oblon, Spivak, McClelland, Maier & Neustadt, L.L.P.

(57) ABSTRACT

A reactor for carrying out a reaction between two fluid starting materials over a catalyst bed with premixing of the fluid starting materials before introduction into the catalyst bed within a delay time of less than 150 ms in a mixing-in device, wherein the mixing-in device is made up of the following elements which are arranged essentially transverse to the inflow direction of the first fluid starting material stream:
  two or three rows arranged behind one another of tubes which have turbulence generators on the outside and constrict the flow cross section for the first fluid starting material stream to from ½ to ⅒, with the second fluid starting material stream being passed through the interiors of the tubes and injected via openings in the tubes into the first fluid starting material stream;
  a perforated plate upstream of the tubes; and
  a perforated plate downstream of the tubes,
is proposed.

24 Claims, 13 Drawing Sheets

U.S. PATENT DOCUMENTS 4,594,227 A * 6/1986 Ohsaki et al. ............... 422/148
6,772,830 B1 * 8/2004 Larsen et al. ............... 165/151

2008/0214883 A1 * 9/2008 Olbert et al. ............... 585/654

* cited by examiner

REACTOR FOR CARRYING OUT A REACTION BETWEEN TWO FLUID STARTING MATERIALS OVER A CATALYST BED WITH PREMIXING OF THE FLUID STARTING MATERIALS IN A MIXING-IN DEVICE

The invention relates to a reactor for carrying out a reaction between two fluid starting materials over a catalyst bed with premixing of the fluid starting materials in a mixing-in device, a mixing-in device for the reactor and also a use.

In chemical engineering, there are a number of processes in which two fluid starting materials are premixed and subsequently reacted over a catalyst bed. For the reaction to proceed uniformly here, it is necessary to have very homogeneous premixing at frequently very short permissible residence times, often below 150 ms or below 50 ms, before the reaction mixture is contacted with the catalyst and the latter takes over control of the course of the reaction.

To achieve this demanding object, mixing-in devices which achieve a very high mixing quality in a very short time, i.e. mixing-in devices having a very low construction height L/D, where L is the length of the mixing-in device in the flow direction of the main fluid and D is the inflow area of the catalyst bed perpendicular to the flow direction of the main fluid, are required.

Known mixing-in devices for reactors through which flow is axial, i.e. in the direction of their longitudinal axis, achieve at best a construction height L/D of four. Such a device is known, for example, from DE-A 10 2004 024 957, according to which a reaction gas is injected axially, i.e. in the longitudinal direction of the reactor, via a bundle of gas feed tubes which are fixed to the tube plates at both ends and are provided with inlet openings for oxygen which is introduced into the intermediate space around the gas feed tubes into an axial flow reactor in which a catalyst bed is located.

In comparison, it was an object of the invention to provide a reactor and a mixing-in device according to which virtually 100% mixing of two fluid starting materials is achieved in a premixing step before these are fed to a catalyst bed, with a greatly reduced length of the mixing-in device in the flow direction of the main fluid and thus with achievement of very short residence times.

The object is achieved by a reactor for carrying out a reaction between two fluid starting materials over a catalyst bed with premixing of the fluid starting materials before introduction into the catalyst bed within a delay time of less than 150 ms in a mixing-in device, wherein the mixing-in device is made up of the following elements which are arranged essentially transverse to the inflow direction of the first fluid starting material stream:

two or three rows arranged behind one another of tubes which have turbulence generators on the outside and constrict the flow cross section for the first fluid starting material stream to from ½ to ¹⁄₁₀, with the second fluid starting material stream being passed through the interiors of the tubes and injected via openings in the tubes into the first fluid starting material stream, and
a perforated plate upstream of the tubes and
a perforated plate downstream of the tubes.

In a preferred embodiment, it has been found that the use of commercial finned tubes known as heat exchangers which have been modified slightly by providing openings in the channels between the fins make it possible to utilize the intermediate spaces of the channels between the fins as virtually ideal mixing chambers with high turbulence by injecting a first fluid starting material stream essentially perpendicular to the finned tubes and a second fluid starting material stream through the interiors of the finned tubes by the openings in the channels into the first fluid starting material stream.

The term fluid refers, in a known manner, to all liquids, vapors and gases which obey the hydrodynamic laws of non-solid continua. The fluid starting materials in the present case are, in particular, gaseous or liquid starting materials, preferably gaseous starting materials. The fluid starting materials can each comprise one or more substances.

The volume flows of the two fluid starting materials are frequently very different, which makes the mixing task correspondingly difficult: the mass flow of the second fluid starting material can, in particular, be from 1 to 30% of the mass flow of the first fluid starting material steam, or from 5 to 20% of this.

The catalyst bed is made up of solid catalyst particles, i.e. the catalyst is a catalyst which is heterogeneous in respect of the fluid starting materials. The solid catalyst particles can preferably form a fixed catalyst bed or, in a further preferred embodiment, a moving catalyst bed.

The catalyst bed can in the case of upright cylindrical reactors be introduced in a horizontal or vertical layer. There can also be a plurality of catalyst beds. The catalyst, generally in the form of free-flowing shaped bodies, can be introduced into holding devices, for example catalyst baskets. The holding devices can more preferably be formed by support gratings, woven meshes, edge slit screens, etc.

The reaction gas mixture flows into the catalyst bed from the side of an inflow face of the bed and leaves the catalyst bed via an outflow face.

According to the invention, a mixing-in device for the fluid starting materials to be reacted, which comprises the following elements:

two or three rows arranged behind one another of tubes which have turbulence generators on the outside and
a perforated plate upstream of the tubes and
a perforated plate downstream of the tubes, is provided upstream of the inflow face of the catalyst bed.

The fluid starting materials are premixed in the mixing-in device. Premixing is understood in the present case to be a mixing prior to entrance into the catalyst bed.

The turbulence generators arranged on the outside of the tubes can be structures of various geometries, but it is essential that they increase the turbulence in the fluids flowing around the tubes. They are preferably elements as are known for static mixers or as packing elements for distillation columns or, for example, crossed strips of metal sheet.

The tubes having turbulence generators on the outside are preferably finned tubes.

Finned tubes are known in chemical engineering and are used, in particular, as heat exchanger tubes. Finned tubes and their production are described, for example, in DE-A 1 950 246 or DE-A 2 131 085.

A finned tube is a tube, generally a metal tube, which have a cylindrical exterior to which elongated strips, viz. the fins, are attached along a longitudinal edge, generally by welding. The fins are frequently attached in a spiral or helical fashion to the exterior of the tube, but can also be attached in the longitudinal direction of this. They normally have a smooth continuous surface but can also be perforated. They can be continuous but can also, advantageously, be cut to a fin base to form segments. Cut fins are particularly suitable for increasing the turbulence. The segments here can have various geometries, for example in the form of rectangles, trapezoids, etc. The cuts between the segments can be configured with or without removal of material. The segments can particularly advantageously be rotated or slanted at an angle to the fin base in order to increase the turbulence, in particular in the regions between the fins, viz. the channels, by means of an angle of incidence and accordingly improve the mixing action.

A dense arrangement of fins over the length of the tube is advantageous; in particular, from 100 to 300 turns of the fins can be provided per meter of tube length.

Tubes having an external diameter in the range from 25 to 150 mm, in particular from 20 to 50 mm, are advantageously used.

The fin height based on the external diameter of the tubes is advantageously in the range from $\frac{1}{10}$ to $\frac{1}{2}$.

The fin thickness can advantageously be from 0.3 to 1.5 mm.

In the case of cut fins, it is advantageous to form segments having a width of from 3 to 12 mm, preferably from 4 to 8 mm.

The tubes can have any cross section, for example circular, oval or polygonal, for example triangular.

The finned tubes are arranged parallel to one another in rows, with one row of finned tubes being able to be located in a plane or arranged along a radius of a circle.

The arrangement of the finned tubes depends, in particular, on the intended flow in the reactor:

In the case of axial flow apparatuses in which the reaction mixture is conveyed in the direction of the longitudinal axis of the frequently cylindrical reactor, the catalyst bed or the catalyst beds are arranged horizontally along a reactor cross section. Correspondingly, the rows of finned tubes which form part of the mixing-in device have to be arranged essentially parallel to the catalyst beds, in a cross-sectional plane of the reactor.

In the case of radial flow reactors having a radial flow direction of the reaction gas mixture, one or more catalyst beds are arranged in the form of a hollow cylinder having a wall thickness appropriate to the bed thickness in suitable accommodation devices, for example baskets. On the inflow side of the catalyst bed, which can be on the inside or the outside, the finned tubes are arranged along a circle concentric with the catalyst bed.

It has been found that two or three rows of finned tubes are suitable for the mixing task according to the invention.

In a preferred embodiment the composition of the second fluid starting material stream can be different in the individual rows of finned tubes. Especially, it is possible to feed into the first row of finned tubes a second fluid starting material stream with a defined composition and into the second row of finned tubes a second fluid starting material stream with a composition different therefrom.

Here, it is advantageous to arrange the second row of finned tubes next to the gaps between the first and, in the case of three rows of finned tubes, arrange the third row of finned tubes next to the gaps in the second row of finned tubes. A heat transfer medium can advantageously flow through the second row and, if appropriate, the third row of finned tubes. It is also possible for the second and, if appropriate, third rows of finned tubes to be formed by solid material of any cross section.

Finned tubes of the same geometry should be used within a row of finned tubes, but the geometry can also vary within the rows of finned tubes.

The finned tubes have in each case at least two diametrically opposite openings per channel of fins on the exterior of the tubes forming them in the channels between the fins; these openings are located at the positions which are closest to the respective adjacent finned tube in the row of finned tubes. The second fluid starting material is injected through these openings in the channels between the fins into the first fluid starting material. In this way, a large number of small-scale mixing chambers having a high turbulence are thus made available in the channels, in particular in the case of fins cut to form segments, with this effect being able to be increased further by slanted setting of the fin segments. An excellent quality of mixing in the micro range is achieved in this way.

A concentric plug-in tube having outflow openings arranged at appropriate intervals on the exterior can in each case be advantageously provided in the interior of the finned tubes in order to predistribute the second fluid starting material stream over the length of the tube and thus also to ensure a largely equalized temperature of this.

The second fluid starting material stream is preferably introduced uniformly into the finned tubes via a ring line as a main distributor and particularly preferably via two ring lines at each end thereof.

The above ring lines can more preferably in turn be supplied via in each case a further additional ring line, preferably having a larger diameter and arranged outside the abovementioned ring lines.

The rows of finned tubes are preceded by a perforated plate which is likewise arranged perpendicular to the inflow direction of the first fluid starting material stream and thus essentially parallel to the plane formed by the rows of finned tubes, in particular in the case of the axial flow reactor, or on a circle concentric with the rows of finned tubes, particularly in the case of the radial flow reactor.

The upstream perforated plate has openings whose total area based on the cross-sectional area of the inflow of the first fluid starting material steam is less than or equal to 0.5, in particular less than or equal to 0.3.

The upstream perforated plate is advantageously located at a distance from the inflow face of the first row of finned tubes which corresponds to from seven to twenty times the diameter of the openings in the upstream perforated plate.

The diameter of the openings in the upstream perforated plate is advantageously smaller than half of the clear spacing of the fins between two successive turns.

Particularly in the case of axial flow reactors, the upstream perforated plate can be omitted if it is ensured that the gas stream is distributed largely uniformly over the reactor cross section.

The mixing-in device has a second perforated plate which is located downstream in the outflow direction from the device and has openings whose diameter is greater than or equal to the diameter of the upstream perforated plate.

Perforated plates are predominantly flat components having openings of any cross section.

The ratio of the thickness of the two perforated plates, viz. the upstream and downstream perforated plates, based on the diameter of the openings in the perforated plates, is preferably in the range from 0.75 to 2.0.

The downstream perforated plate is advantageously arranged at a distance of from 0.75 to 2.0 times the diameter of the finned tubes of the last row of finned tubes from the outflow plane of the last row of finned tubes.

The downstream perforated plate is advantageously located at a distance corresponding to from 5 to 20 times the diameter of the openings in the downstream perforated plate from the entry into the catalyst bed.

The material for the finned tubes and the perforated plates is preferably stainless steel; materials which are resistant to oxidation and, if appropriate, carbonization at elevated temperature are particularly preferred.

The mixing-in device is arranged essentially transverse to the flow direction of the first fluid starting material stream. This means that the first fluid starting material stream is introduced in the direction of the normals to the main extension of the mixing-in device which can be flat as in the case of axial flow reactors, or curved, as in the case of radial flow reactors. However, the term essentially transverse also encompasses deviations from the normals of ±5° or ±10° or even ±30°.

The mixing-in device can at construction depths, i.e. a distance between the upstream perforated plate and the downstream perforated plate, in the range from 100 to 200 mm achieve excellent, virtually 100% mixing with a pressure drop in the first fluid starting material stream, frequently the reaction gas, in the order of 20 mbar and a pressure drop in the second fluid starting material stream, frequently an oxygen-comprising stream which for safety reasons alone has to be under at least slightly superatmospheric pressure, in the range from about 50 to 100 mbar.

An extremely large number of points of injection of the second fluid starting material stream into the first fluid starting material stream in the order of 10 000 points of injection per m$^2$ is achieved.

The invention also provides a mixing-in device for a reactor of the type described above, which comprises the above-described elements: two or three rows of tubes provided which have turbulence generators, in particular finned tubes, an upstream perforated plate and a downstream perforated plate.

The above-described reactor and the mixing-in device are particularly suitable for carrying out reactions of a first gaseous reaction mixture with an oxygen-comprising gas stream, for example air, in particular for carrying out oxydehydrogenations of hydrocarbons, for example propane or butane, for the partial oxidation of natural gas by means of air, for desulfurization, for catalytic cracking or generally for reactions known as chemical conversion.

The invention also provides a static mixer for two or more fluids, which is composed of the elements of the above described mixing-in device, which are arranged essentially transverse to the inflow direction of the first fluid starting material stream:

A reactor for carrying out a reaction between two fluid starting materials over a catalyst bed with premixing of the fluid starting materials before introduction into the catalyst bed within a delay time of less than 150 ms in a mixing-in device, wherein the mixing-in device is made up of the following elements which are arranged essentially transverse to the inflow direction of the first fluid starting material stream:
two or three rows arranged behind one another of tubes which have turbulence generators on the outside and constrict the flow cross section for the first fluid starting material stream to from ½ to ⅒, with the second fluid starting material stream being passed through the interiors of the tubes and injected via openings in the tubes into the first fluid starting material stream, and
a perforated plate upstream of the tubes and
a perforated plate downstream of the tubes.

The mixer is not limited to the type of the fluids to be mixed. The fluids can be especially gases or liquids, preferably gases. The fluids to be mixed can each comprise one or more substances. These need not react chemical with each other.

The mixer can show all the embodiments which are described in the proceeding for the mixing-in-device.

The mixer is especially build-up in a modular type, i.e., the number of tubes in the two or three rows arranged behind one another can be extended according to requirements, practically without limits, so that it is possible to make available inflow areas from a few square centimeters to arbitrary dimensions, for example of several 100 m$^2$.

The static mixer is cost and energy advantageous, producible from elements commercially available. It shows a small height for a highly homogenous mixing (mixing quality >99.9%), with ultra short mixing time, <50 ms, for two or more fluids.

The invention is described in more detail below with the aid of a drawing and an example.

In the drawing.

In the figures, identical reference numerals denote identical or corresponding features.

Figure 1A:
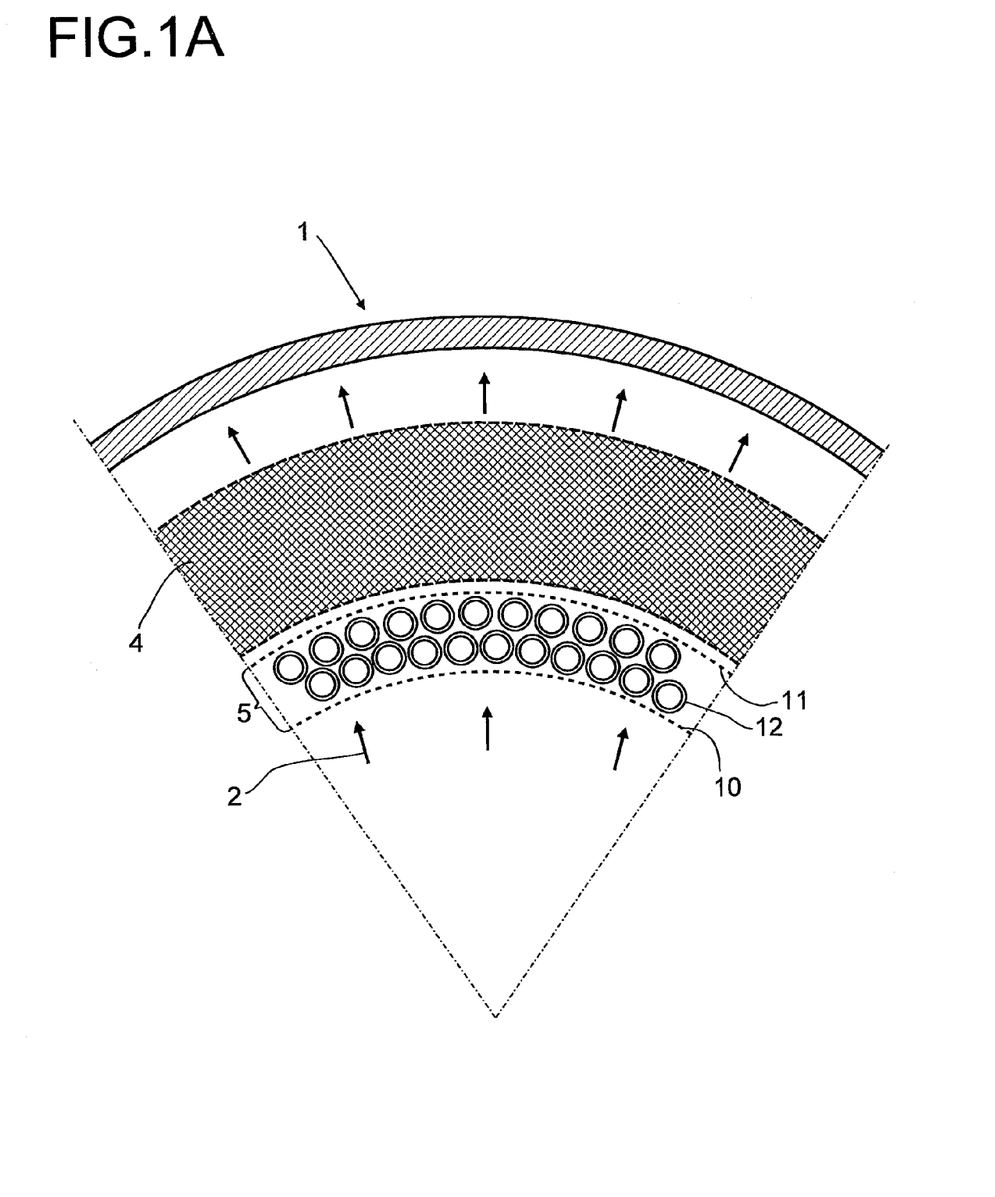
FIG. 1A shows a segment of a section through a radial flow reactor according to the invention having a flow direction of the first fluid starting material stream from the inside outward.

FIG. 1A shows a segment of a cross section through a first embodiment of a radial flow reactor 1 according to the invention with introduction of a first fluid stream 2 via the interior of the reactor and outflow of this at the outer wall of the reactor. The first fluid starting material stream 2 impinges perpendicularly onto a mixing-in device 5 comprising two rows of finned tubes 12 which are arranged so that the tubes are located next to the gaps in the other row and are preceded in the flow direction by a first perforated plate 10 and are followed by a second perforated plate 11. The two rows of finned tubes 12 and the upstream perforated plate 10 and the downstream perforated plate 11 are each arranged on concentric circles. The reaction mixture which has been premixed in the mixing-in device 5 subsequently flows through the catalyst bed 4.

Figure 1B:
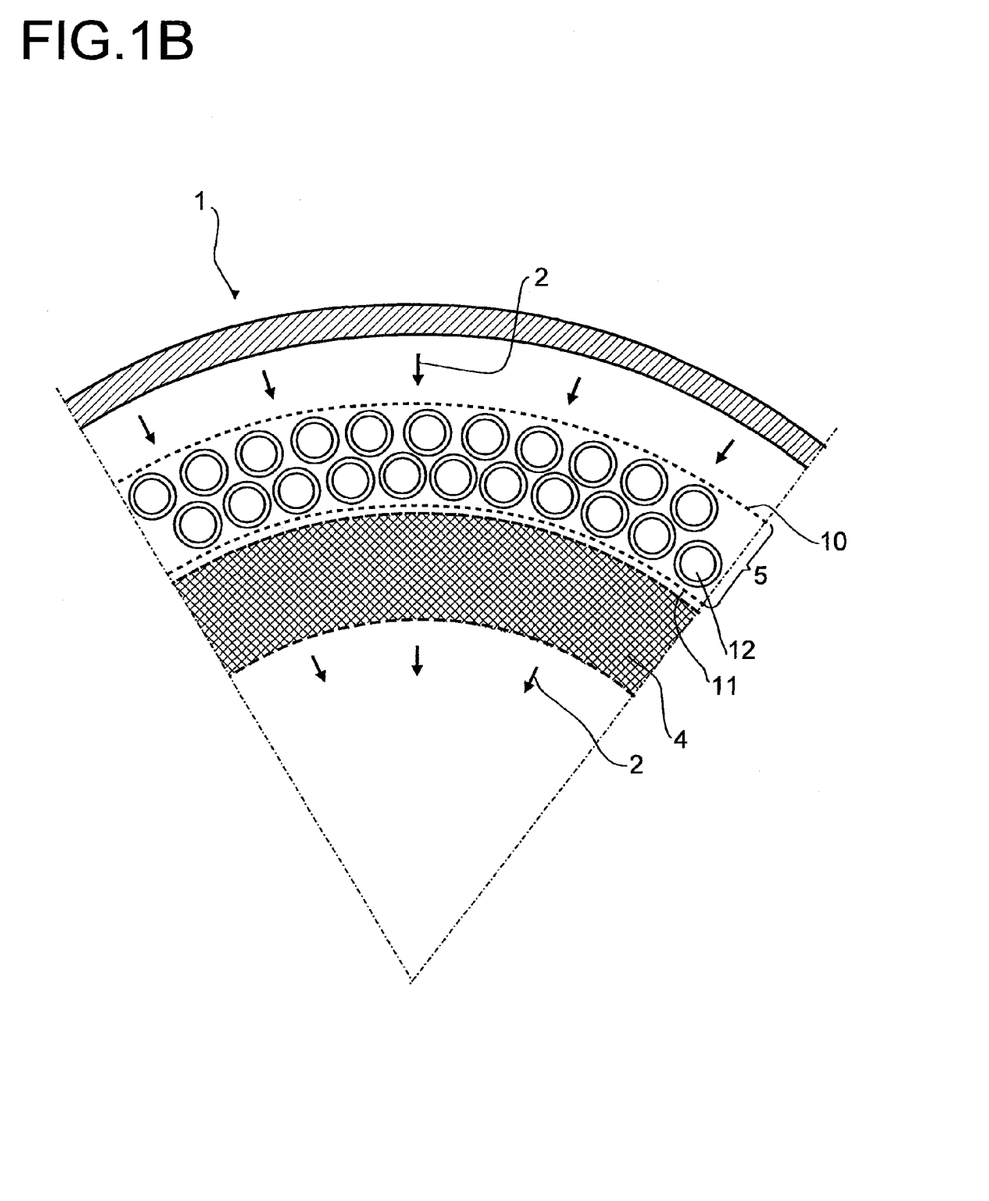
FIG. 1B shows a view analogous to FIG. 1A but with the flow direction of the first fluid starting material stream from the outside inward.

FIG. 1B shows a segment of the cross section through a further radial flow reactor according to the invention, but with the difference from that in FIG. 1A that the flow of the first fluid starting material stream 2 is from the outside inward. Accordingly, the mixing-in device 5 comprising two rows of finned tubes 12 and an upstream perforated plate 10 and a downstream perforated plate 11 is, because it is upstream of the catalyst bed 4, arranged along circles having a greater radius than the catalyst bed 4.

Figure 2A:
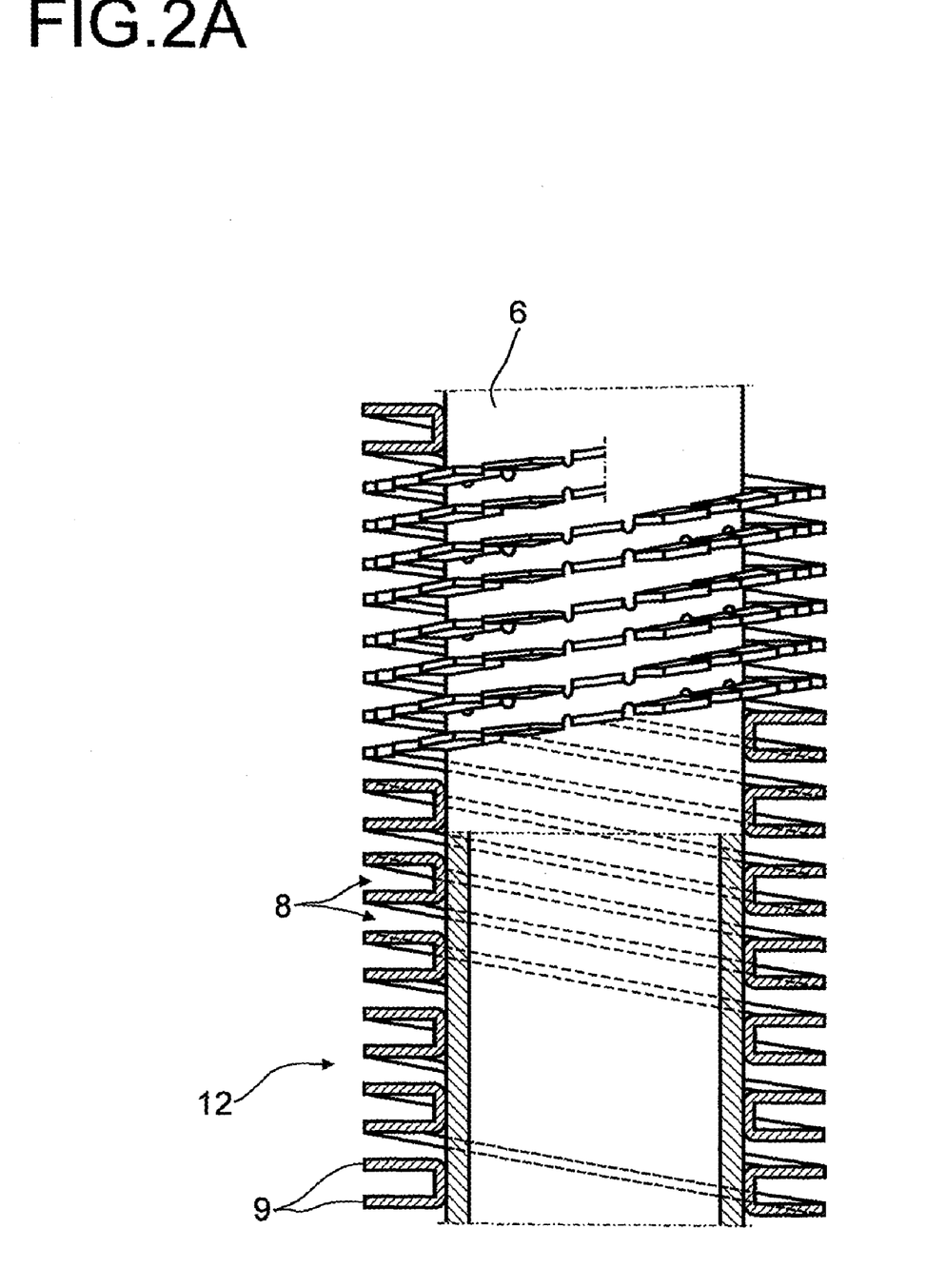
FIG. 2A shows a detail of a finned tube, with depiction of an individual fin and the procedures for producing it in FIG. 2B and a cross section through a finned tube in FIG. 2C.
Figures 2B, 2C:
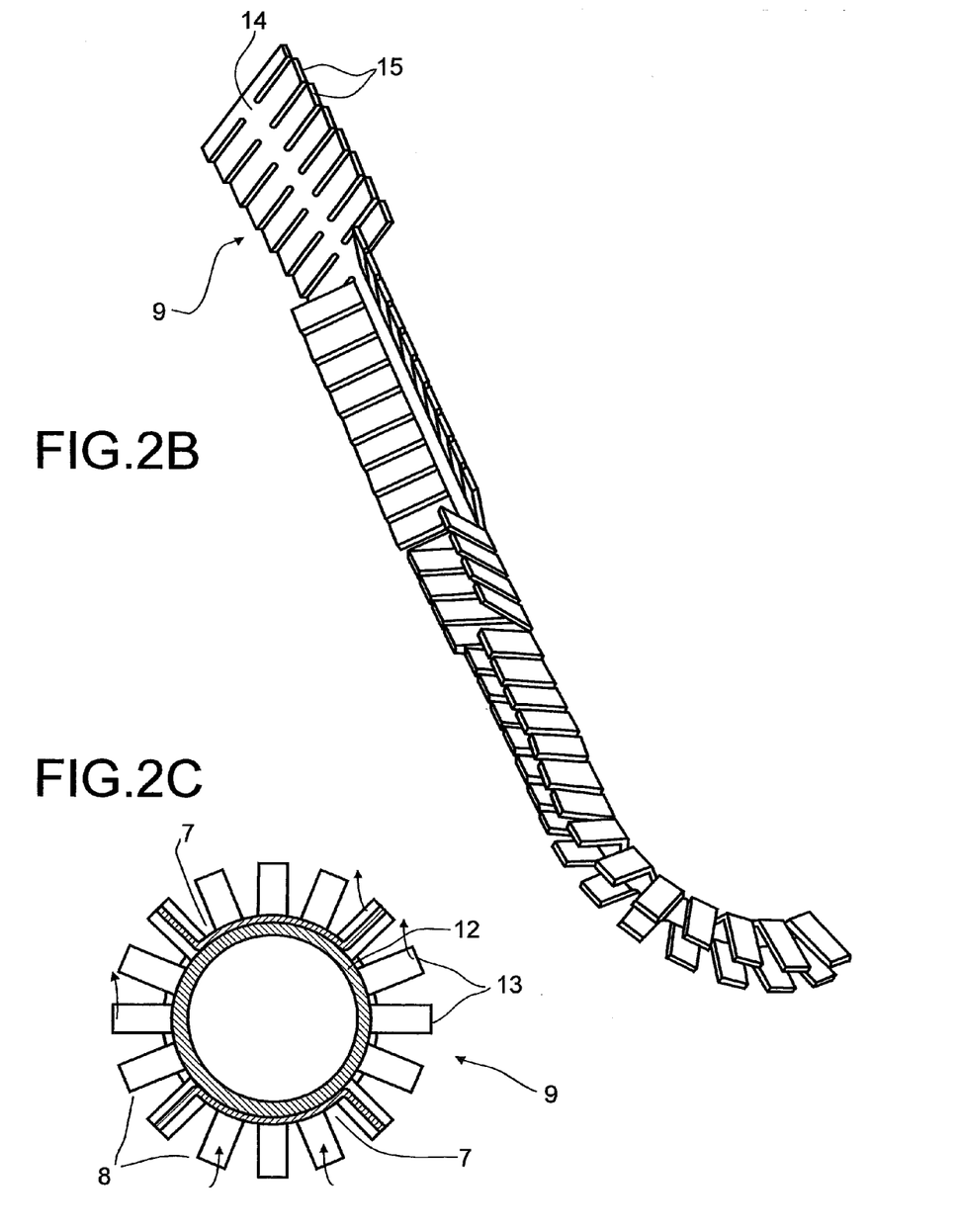

FIGS. 2A to 2C show details of finned tubes 12 having openings 7 which are arranged diametrically opposite to one another in the channels 8 between the fins 9 of the finned tubes 12. Here, FIG. 2B shows a fin 9 which is divided by cuts down to a rib base 14 into segments 13 and FIG. 2C shows a cross section through a finned tube 12 with tube 6, channels 8 and segments 13.

Figure 3:
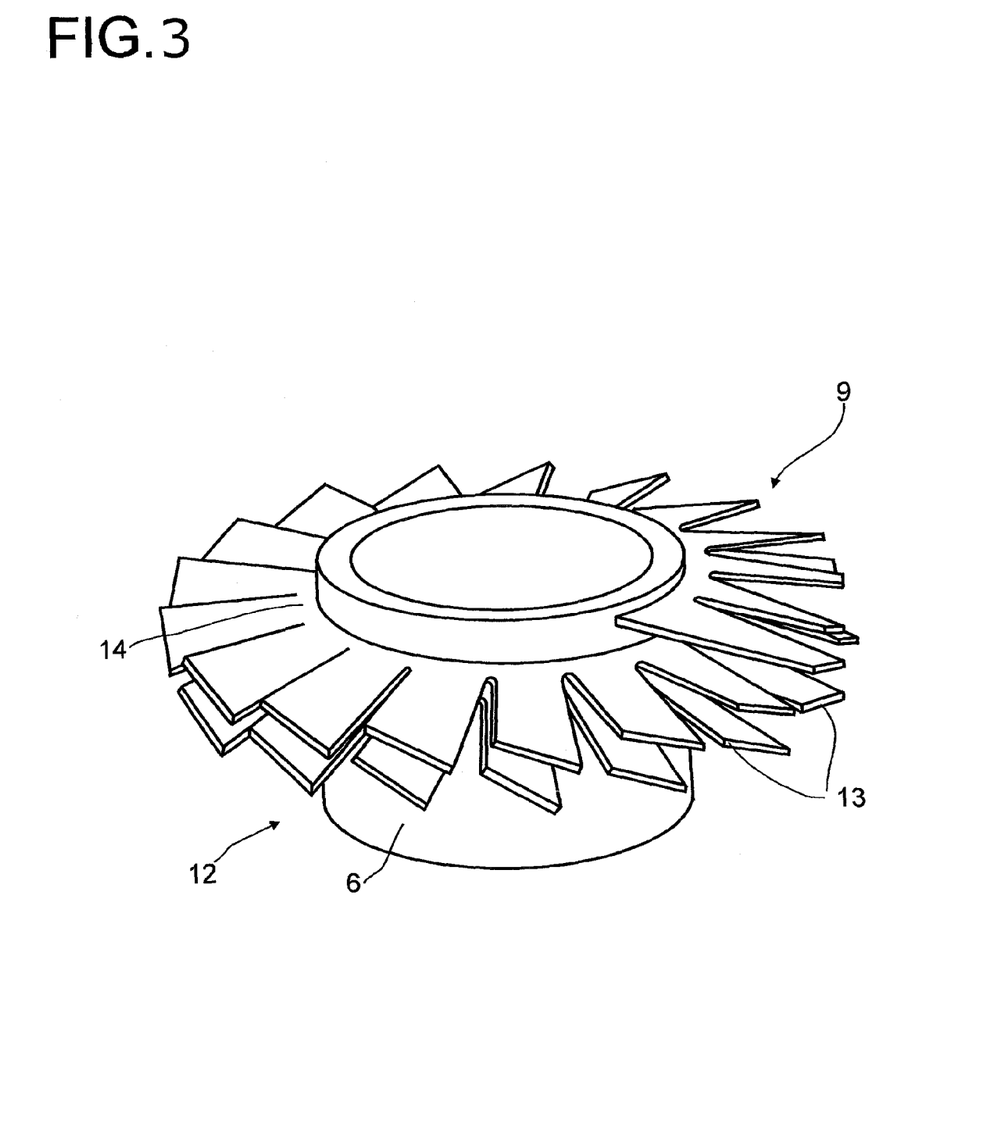
FIG. 3 shows a perspective view of a finned tube.

FIG. 3 shows a perspective view of a finned tube 12 with tube 6 and helical fin 9 which is divided, with the exception of a continuous fin base 14, into segments 13.

Figure 4A:
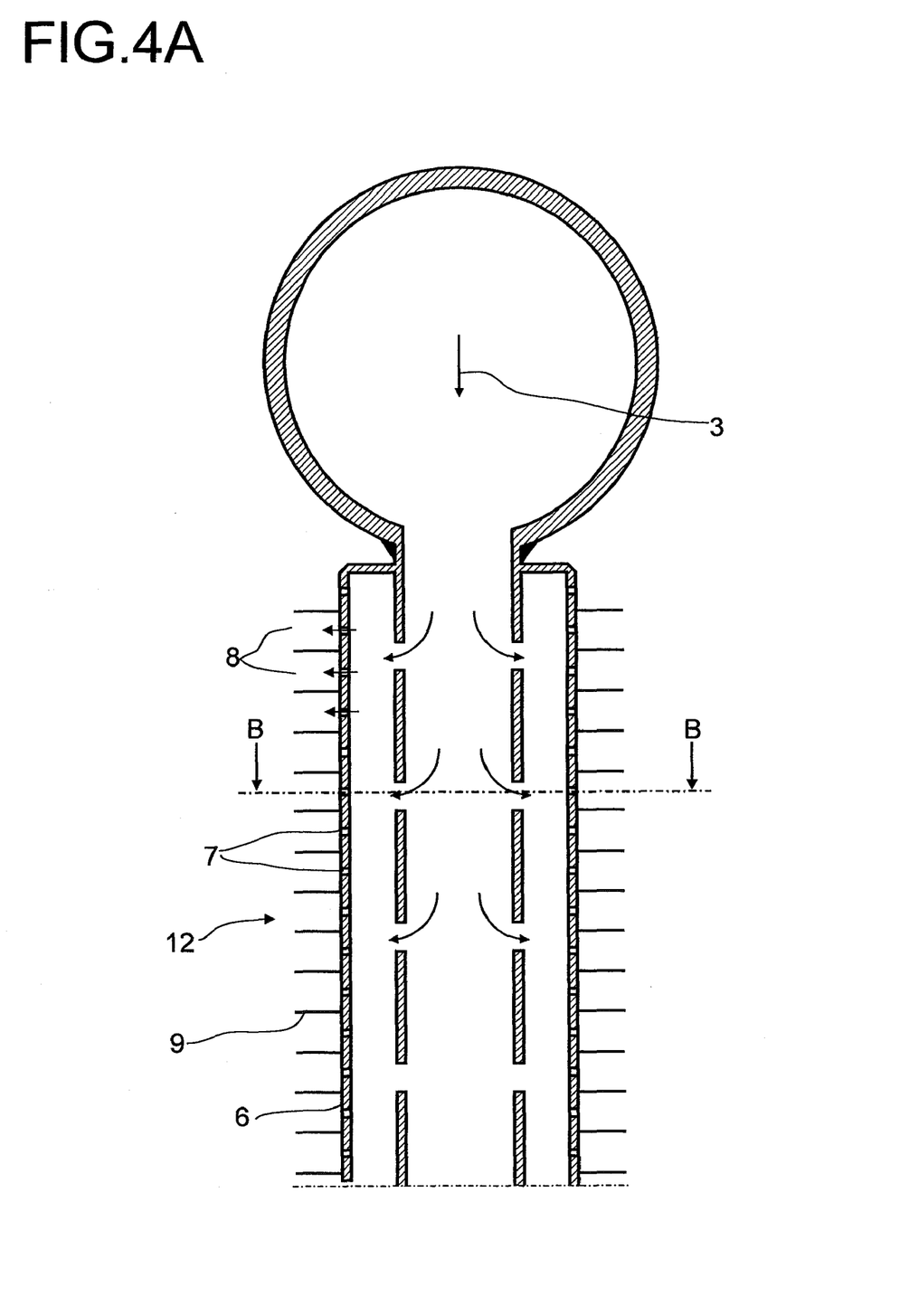
FIG. 4A shows a longitudinal section through a preferred embodiment of a finned tube, with depiction of a cross section in FIG. 4B.
Figure 4B:
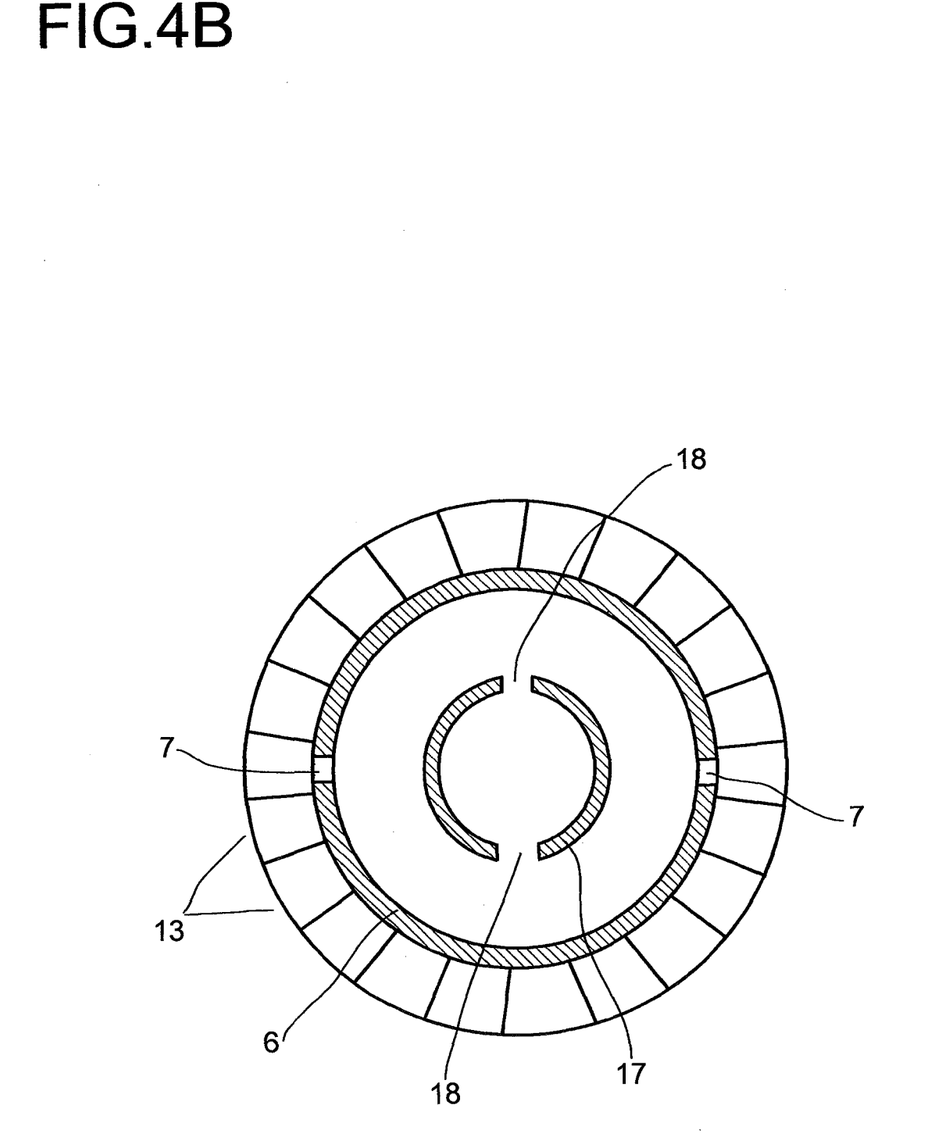

FIG. 4A shows a longitudinal section through a finned tube 12 with tube 6 and fins 9, with openings 7 in the channels 8 between the fins 9 of the finned tubes 12. In the interior of the tube, there is a concentric central plug-in tube 17 which has openings 18, which can be seen in the cross section in the plane B-B in FIG. 4B, and by means of which the second fluid starting material stream 3 is distributed in the longitudinal direction of the finned tubes 12. In FIG. 4A, one end of the finned tube 12 is provided with a ring distributor 19 for the second fluid starting material stream 3.

Figure 5A:
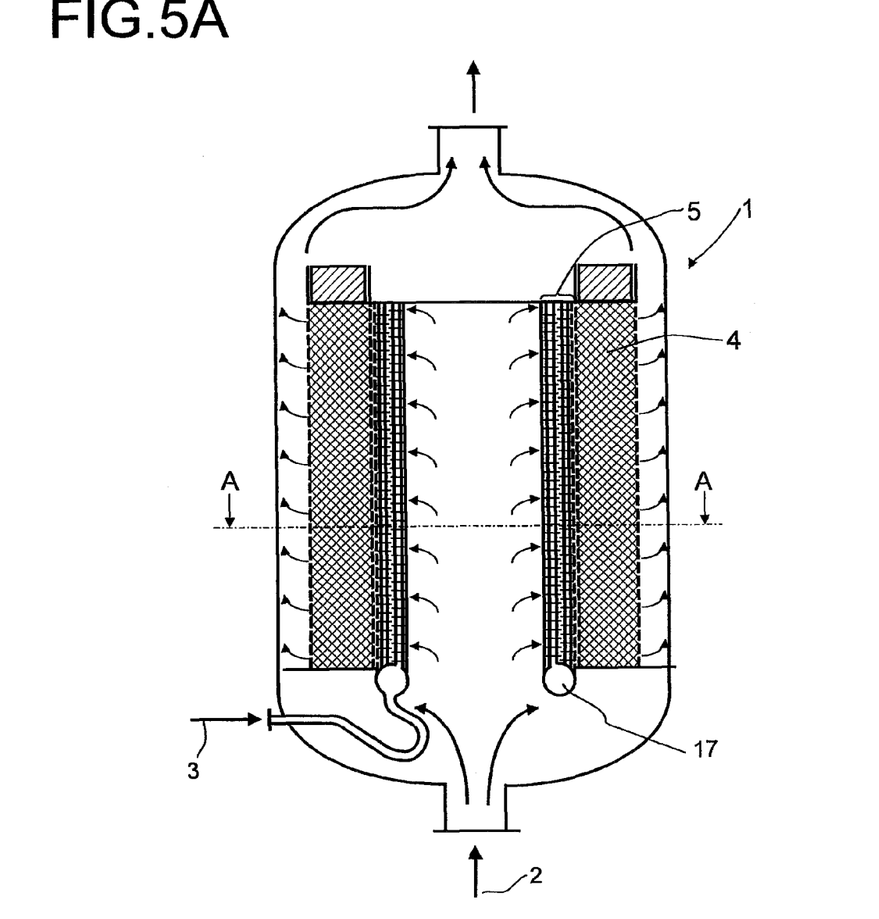
FIG. 5A shows a preferred embodiment of a radial flow reactor according to the invention, with flow from the inside outward and a depiction of the cross section in FIG. 5B.

FIG. 5A shows a longitudinal section through a radial flow reactor with introduction of the first fluid starting material stream 2 through the central interior space of the reactor and discharge at the outer wall of the reactor 1.

Figure 5B:
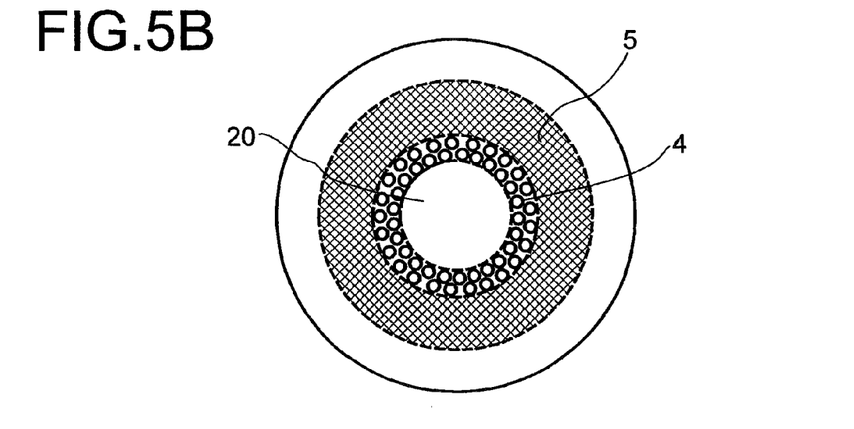

FIG. 5B clearly shows, in addition to the annular arrangement of catalyst bed 4 and mixing-in device 5 in the cross section, the central cross section 20 through which the first fluid starting material stream 2 flows.

Figure 5C:
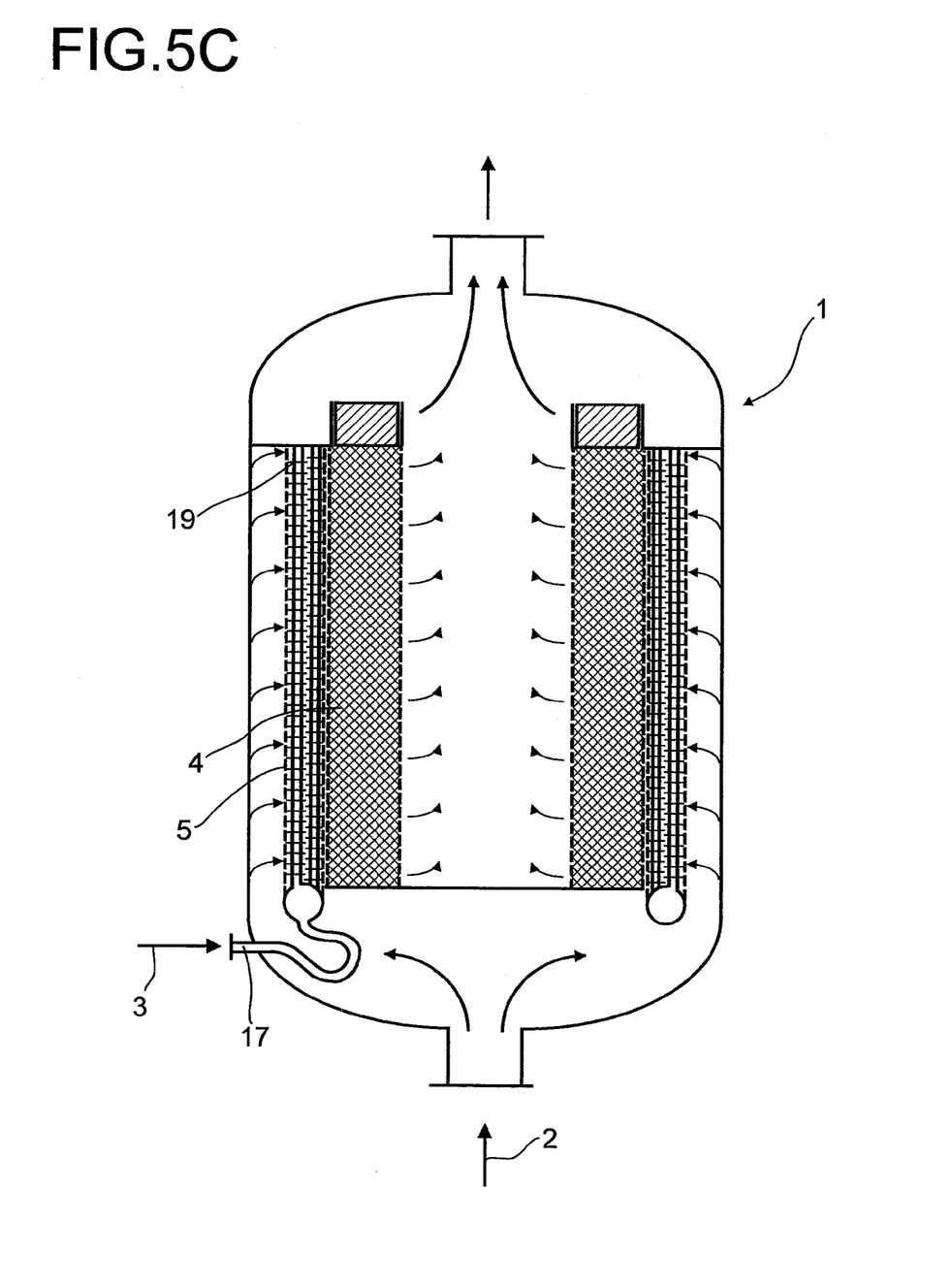
FIG. 5C shows a further embodiment of a radial flow reactor according to the invention with flow from the outside inward.

The reactor depicted in longitudinal section in FIG. 5C is analogous to the reactor of FIG. 5A, but with introduction of the first fluid starting material stream 2 from the outside inward and correspondingly with the mixing-in device 5 being arranged outside the catalyst bed 4.

Figure 6:
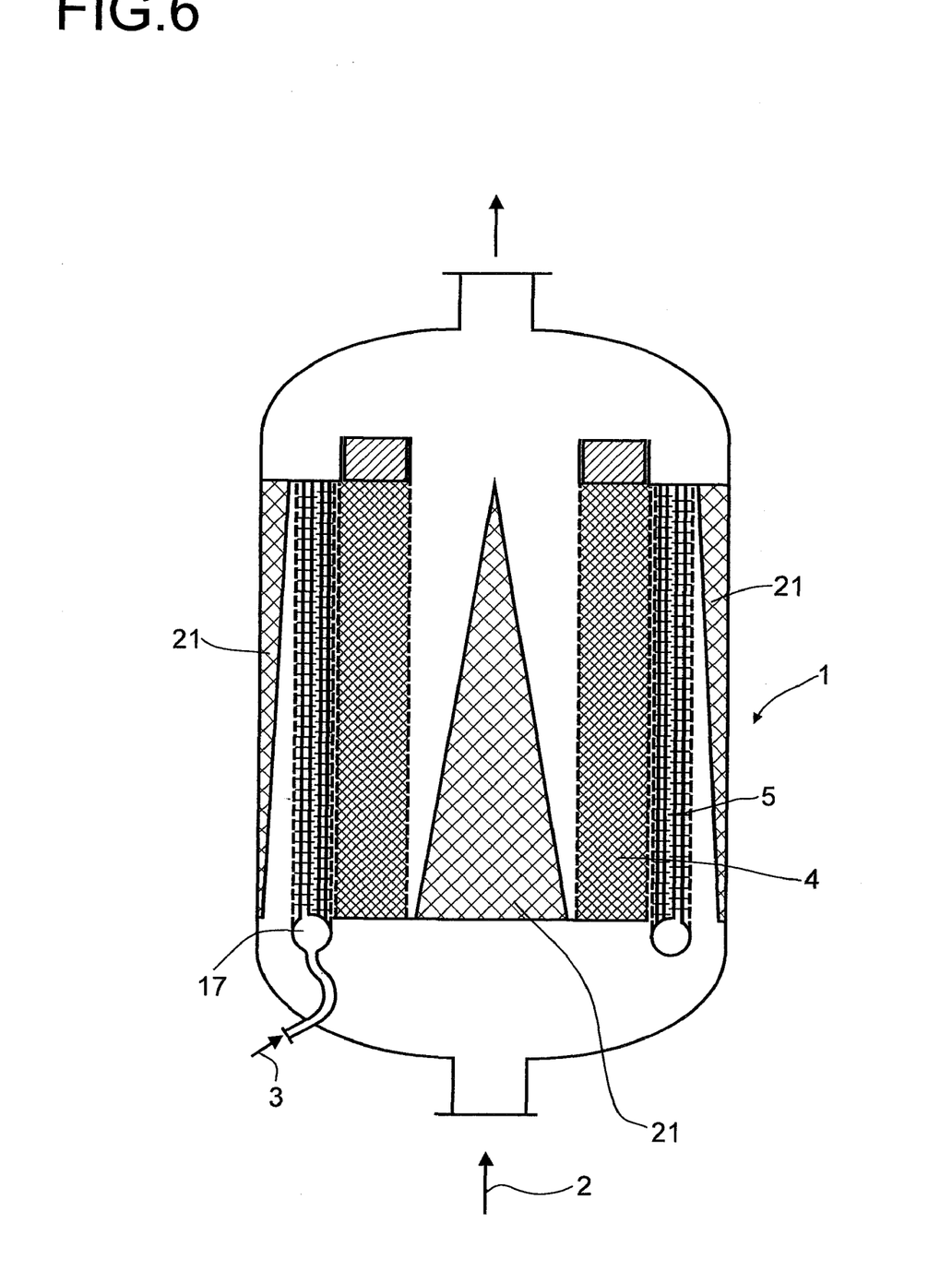
FIG. 6 shows a further preferred embodiment of a radial flow reactor according to the invention.

FIG. 6 depicts a further preferred embodiment of a reactor 1 according to the invention with flow of the second fluid starting material stream 3 from the outside inward and with displacement bodies 21 in the central interior space and at the reactor wall, which displacement bodies can preferably be, as shown in the figure, parabolic.

Figure 7A:
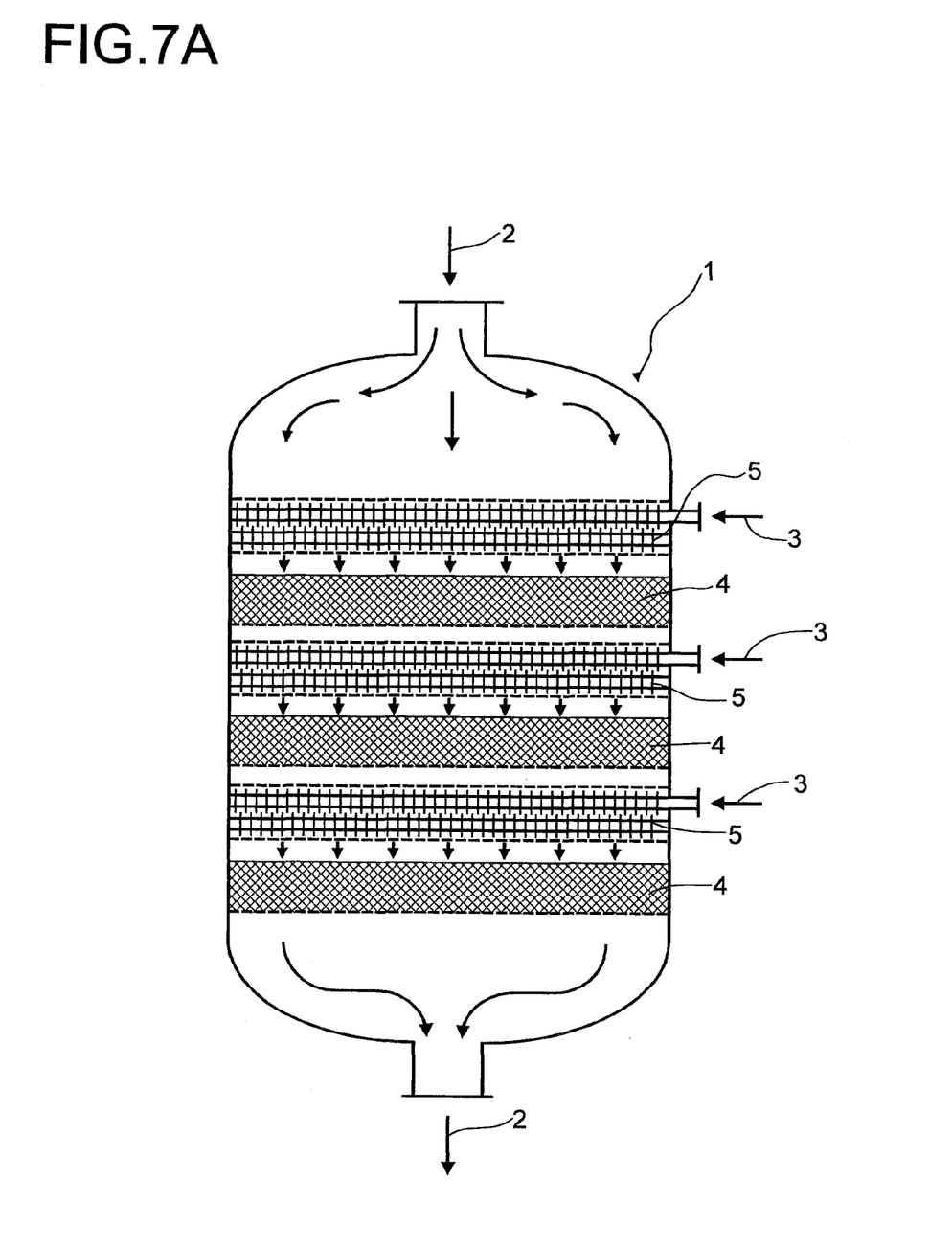
FIG. 7A shows a preferred embodiment of an axial flow reactor according to the invention, with depiction of a detail of the mixing-in device in FIG. 7B.
Figure 7B:
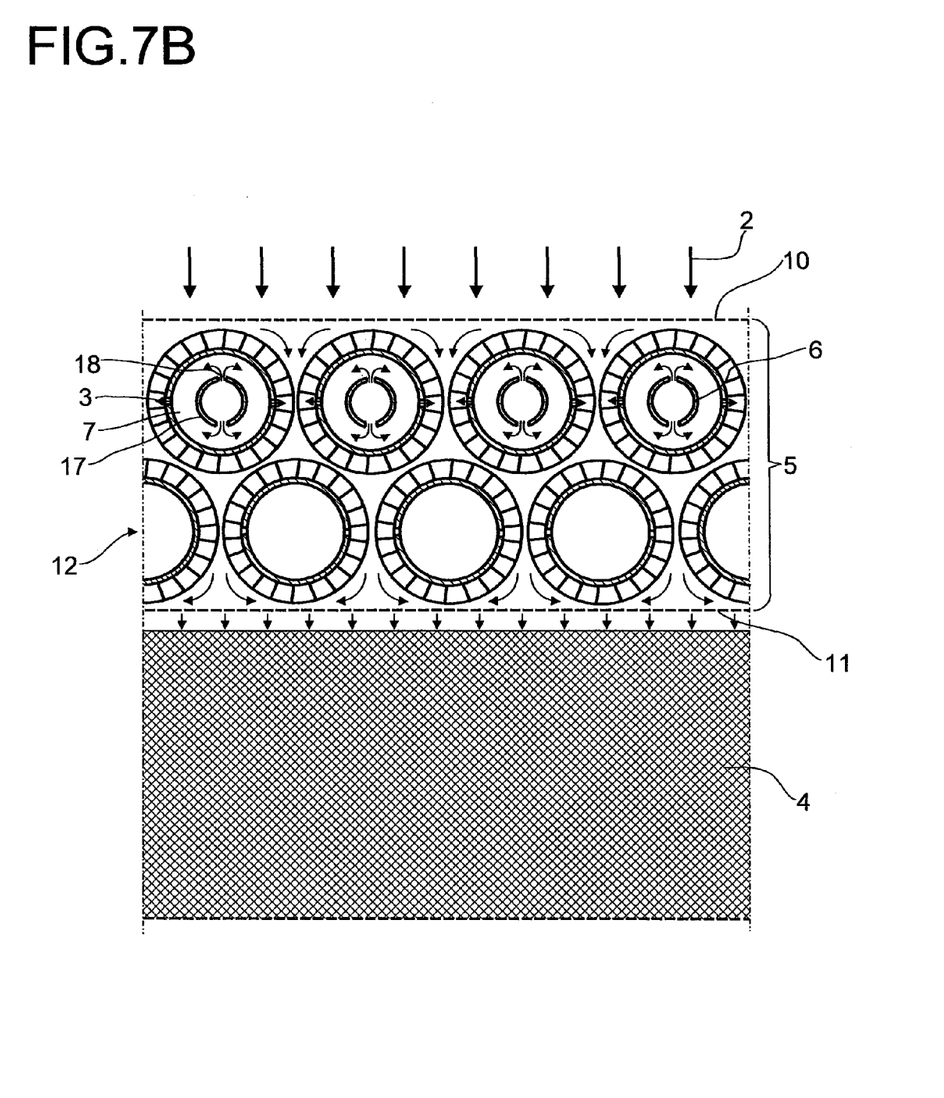

FIG. 7A shows a longitudinal section through an axial flow reactor having catalyst beds 4 and mixing-in devices 5 arranged in planes, with depiction of a longitudinal section in FIG. 7A and a detail of a longitudinal section in a plane perpendicular to the plane depicted in FIG. 7A in FIG. 7B. The detail in FIG. 7B shows two rows of finned tubes 12 with openings 7 for exit of the second fluid starting material stream 3 from the interior of the finned tubes 12, with additional predistribution of the further fluid starting material stream 3 via central plug-in tubes 17 having openings 18, and also an upstream perforated plate 10 and a downstream perforated plate 11.

Figure 8:
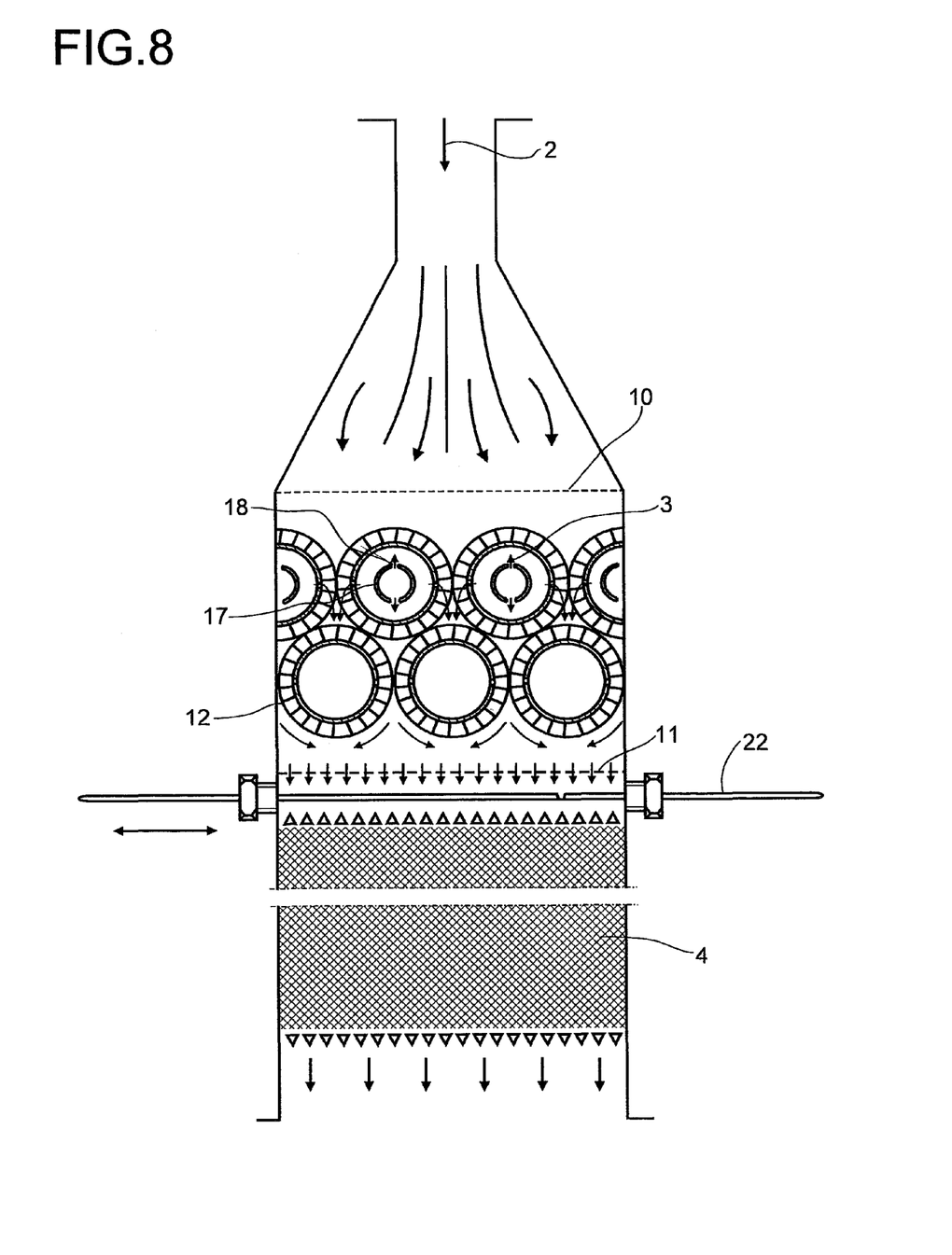
FIG. 8 shows a longitudinal section through an experimental module for determining the quality of mixing.

FIG. 8 shows a longitudinal section through an experimental module for determining the quality of mixing, which has two rows of finned tubes 6, with central plug-in tubes 17 having openings 18, upstream perforated plate 10 and downstream perforated plate 11, and also having an exchangeable catalyst bed 4 and a measuring rod 22 for measuring the concentration which can be pulled out.

EXAMPLE

The mixing quality of model gases, namely a first main gas stream consisting of nitrogen and a second gas stream consisting of nitrogen and 10% by volume of carbon dioxide and having a 10-fold lower volume flow compared to the main gas stream, was determined by means of the experimental module shown in FIG. 8. The mixing-in device comprised two rows of finned tubes 12 which were arranged so that the tubes of one row were next to the gaps in the other row, with each row consisting of three tubes 6 having an external diameter of 31.7 mm and a helical fin 9 which went around the tube 17 times and was cut into segments having a width of 4 mm and a height of 6.4 mm. An upstream perforated plate 10 having an opening ratio of 5% was arranged at a distance of 15 mm from the inflow plane of the first row of finned tubes 12 and a downstream perforated plate having an opening ratio of likewise 5% was arranged at a distance of likewise 15 mm from the outflow plane of the second row of finned tubes.

The concentration of carbon dioxide in the stream of nitrogen was determined by infrared absorption using a UNOR 6N instrument from Maihak, Hamburg. To rule out calibration uncertainties, a 20 m long piece of tubing was attached to the end of the measuring rod and gas for reference measurement was introduced into the instrument just before the end of the tubing. The reference measurement indicated precisely 1% by volume of carbon dioxide.

To determine the quality of mixing produced by the mixing-in device of the invention comprising finned tubes, an upstream perforated plate and a downstream perforated plate, the measuring rod 22 was continuously pushed through the apparatus and samples were taken at intervals of 2 mm and the carbon dioxide concentration of these was determined by infrared absorption using the abovementioned instrument. Measured values ranging from 0.99% by volume of carbon dioxide and 1.01% by volume of carbon dioxide, i.e. deviations of not more than ±1% from the value of the reference measurement, and thus excellent mixing over the entire cross section of the apparatus were measured.

LIST OF REFERENCE NUMERALS 1 reactor
2 first fluid starting material
3 second fluid starting material
4 catalyst bed
5 mixing-in device
6 tubes
7 openings in the tubes 6
8 channels
9 fins
10 upstream perforated plate
11 downstream perforated plate
12 finned tube
13 segments
14 fin base
15 openings in 10
16 openings in 11
17 central plug-in tube
18 openings in the central plug-in tube 17
19 ring distributor
20 cross section through which the first fluid starting material stream flows
21 displacement body
22 measuring rod

The invention claimed is:

1. A reactor for carrying out a reaction between at least a first and a second fluid starting material over a catalyst bed with premixing of the fluid starting materials into a reaction mixture before introduction into the catalyst bed within a delay time of less than 150 ms in a mixing-in device, wherein the mixing-in device comprises, arranged essentially transverse to an inflow direction of a first fluid starting material stream:

two or three rows arranged behind one another of tubes which comprise turbulence generators on an outside surface of the tubes and constrict a flow cross section for the first fluid starting material stream to from ½ to ⅒, with a second fluid starting material stream being passed through interiors of the tubes and injected via openings in the tubes into the first fluid starting material stream;
an upstream perforated plate upstream of the tubes, comprising openings; and
a downstream perforated plate downstream of the tubes, comprising openings.

2. The reactor according to claim 1, wherein the tubes have an external diameter in a range from 25 to 150 mm.

3. The reactor according to claim 1, wherein an opening ratio in the upstream perforated plate, defined as a sum of free areas of the openings in the upstream perforated plate based on total cross-sectional area perpendicular to the inflow direction of the first fluid starting material stream into the mixing-in device, is $\leq 0.5$.

4. The reactor according to claim 1, wherein a ratio of a thickness of the upstream or downstream perforated plate to the diameter of the openings in the upstream or downstream perforated plate is in the range from 0.75 to 2.0.

5. The reactor according to claim 1, wherein the diameter of the openings in the downstream perforated plate is greater than or equal to the diameter of the openings in the upstream perforated plate.

6. The reactor according to claim 1, wherein a distance from the downstream perforated plate to an entry point of the reaction mixture into the catalyst bed corresponds to from 5 to 20 times a diameter of the openings in the downstream perforated plate.

7. The reactor according to claim 1, wherein materials from which the tubes and the perforated plates are fabricated are resistant to oxidation and, optionally, carbonized at elevated temperature.

8. A process for carrying out chemical reactions between a first and a second fluid starting material over a catalyst bed in the reactor according to claim 1, wherein the first fluid starting material stream is a reaction gas mixture and the second fluid starting material stream is an oxygen-comprising gas stream.

9. A mixing-in device for a reactor according to claim 1.

10. A static mixer for two or more fluids, comprising:
the mixing-in device according to claim 9, arranged essentially transverse to an inflow direction of the first fluid starting material stream:
two or three rows arranged behind one another of tubes which comprise turbulence generators on an outside surface of the tubes and constrict a flow cross section for a first fluid starting material stream to from $\frac{1}{2}$ to $\frac{1}{10}$, with a second fluid starting material stream being passed through interiors of the tubes and injected via openings in the tubes into the first fluid starting material stream;
a perforated plate upstream of the tubes; and
a perforated plate downstream of the tubes.

11. The reactor according to claim 1, wherein the tubes which comprise turbulence generators are finned tubes, with the turbulence generators being configured as fins and the openings opening into the tubes in channels between the fins.

12. The reactor according to claim 11, wherein the finned tubes constrict a free flow cross section for the first fluid starting material stream to from $\frac{1}{3}$ to $\frac{1}{6}$ of original size.

13. The reactor according to claim 11, wherein the finned tubes are tubes which have a cylindrical exterior and comprise fins of elongated strips, the elongated strips being welded along a longitudinal edge in a spiral fashion onto the cylindrical exterior, and wherein the fins are cut, with the exception of a fin base, to form segments.

14. The reactor according to claim 13, wherein the segments are rotated at an angle to the fin base.

15. The reactor according to claim 11, wherein the finned tubes have from 100 to 300 turns of the fins per meter length of tube.

16. The reactor according to claim 11, wherein a ratio of height of the fins to external diameter of the tubes is in a range from $\frac{1}{10}$ to $\frac{1}{2}$.

17. The reactor according to claim 13, wherein the fins have a thickness in a range from 0.3 to 1.5 mm and the segments have a width in a range from 3 to 12 mm.

18. The reactor according to claim 11, wherein the second row of finned tubes is arranged so that the tubes of the second row are located next to gaps in the first row of finned tubes.

19. The reactor according to claim 18, comprising three rows of finned tubes, with the third row of finned tubes being arranged so that the tubes are located next to gaps in the second row of finned tubes.

20. The reactor according to claim 11, wherein a heat transfer medium flows through the second row and, optionally, the third row of finned tubes or the second and, optionally, third rows are formed by solid material of any cross section.

21. The reactor according to claim 11 which has in each case two openings per channel between the fins of the finned tubes in diametrically opposite positions on the channels, with a minimum distance to an adjacent finned tube in the row of finned tubes.

22. The reactor according to claim 11, wherein the upstream perforated plate is arranged at a distance corresponding to from 7 to 20 times a diameter of the openings in the upstream perforated plate, from an inflow plane of the first row of finned tubes for the first fluid starting material.

23. The reactor according to claim 11, wherein the diameter of the openings in the upstream perforated plate is smaller than half of a clear spacing of the fins between two successive turns.

24. The reactor according to claim 11, wherein the downstream perforated plate is located at a distance of from 0.5 to 2 times a diameter of the finned tubes of a last row of finned tubes from an outflow plane of the finned tubes.

* * * * *